United States Patent
Vasgaard et al.

(10) Patent No.: US 10,229,406 B2
(45) Date of Patent: Mar. 12, 2019

(54) SYSTEMS AND METHODS FOR AUTONOMOUS ITEM IDENTIFICATION

(71) Applicant: Walmart Apollo, LLC, Bentonville, AR (US)

(72) Inventors: Aaron James Vasgaard, Fayetteville, AR (US); Matthew Allen Jones, Bentonville, AR (US); Nicholaus Adam Jones, Fayetteville, AR (US); Robert James Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/707,076

(22) Filed: Sep. 18, 2017

(65) Prior Publication Data

US 2018/0082279 A1  Mar. 22, 2018

Related U.S. Application Data

(60) Provisional application No. 62/397,108, filed on Sep. 20, 2016.

(51) Int. Cl.
*G07G 1/00* (2006.01)
*G06Q 20/32* (2012.01)
(Continued)

(52) U.S. Cl.
CPC .......... *G06Q 20/322* (2013.01); *B62B 3/001* (2013.01); *G06Q 10/087* (2013.01);
(Continued)

(58) Field of Classification Search
CPC ............... G06Q 10/087; G06Q 20/322; G06Q 30/0633; B62B 3/001
See application file for complete search history.

(56) References Cited

U.S. PATENT DOCUMENTS

| 4,071,740 A | 1/1978 | Gogulski |
| 6,997,382 B1 | 2/2006 | Bhri |

(Continued)

FOREIGN PATENT DOCUMENTS

| WO | 2000073971 A1 | 12/2000 |
| WO | 2001033500 A1 | 5/2001 |

(Continued)

OTHER PUBLICATIONS

International Search Report and Written Opinion for Application No. PCT/US2017/052061, dated Nov. 20, 2017.

*Primary Examiner* — Seung H Lee
(74) *Attorney, Agent, or Firm* — McCarter & English, LLP; David R. Burns (57) ABSTRACT

Methods, systems, and machine readable medium are provided for autonomous item identification in an environment including a mobile computational device and a container. One or more sensors are disposed at the container to sense a selected item being placed in the container. In response to sensing the selected item being placed in the container, a location of the container is determined using a positioning system. One or more physical characteristics of the selected item is sensed via the one or more sensors at the container. A set of stored characteristics is retrieved from a database for available items proximate to the location of the container. An identification code for the selected item is identified based on a comparison of the one or more physical characteristics of the selected item with the stored characteristics retrieved from the database of the available items based on the location of the container.

20 Claims, 5 Drawing Sheets

(51) Int. Cl.
    *B62B 3/00*           (2006.01)
    *G06Q 10/08*         (2012.01)
    *G06Q 30/06*         (2012.01)
    *G06Q 20/20*         (2012.01)

(52) U.S. Cl.
    CPC ....... *G06Q 20/208* (2013.01); *G06Q 20/3276* (2013.01); *G06Q 30/0633* (2013.01); *G07G 1/0081* (2013.01)

(56) References Cited

U.S. PATENT DOCUMENTS

| | | |
|---|---|---|
| 7,648,068 B2 | 1/2010 | Silverbrook et al. |
| 7,839,284 B2 | 11/2010 | Rosebush |
| 8,371,504 B2 | 2/2013 | Connelly |
| 8,950,671 B2 | 2/2015 | Chan et al. |
| 9,033,238 B2 | 5/2015 | Davis |
| 9,064,161 B1 * | 6/2015 | Boman .................... G06K 7/01 |
| 9,392,920 B2 | 7/2016 | Halloran et al. |
| 2005/0189411 A1 | 9/2005 | Ostrowski et al. |
| 2007/0125848 A1 | 6/2007 | Bannetto Piamenta |
| 2008/0296392 A1 | 12/2008 | Connell, II et al. |
| 2008/0308630 A1 * | 12/2008 | Bhogal .................. G06Q 30/02 235/383 |
| 2012/0310744 A1 | 12/2012 | Kim et al. |
| 2016/0261698 A1 | 9/2016 | Thompson et al. |

FOREIGN PATENT DOCUMENTS

| | | |
|---|---|---|
| WO | 2013033442 A1 | 3/2013 |
| WO | 2016135142 A1 | 9/2016 |

* cited by examiner

SYSTEMS AND METHODS FOR AUTONOMOUS ITEM IDENTIFICATION

CROSS REFERENCE TO RELATED APPLICATIONS

This application claims priority to U.S. Provisional Application No. 62/397,108 filed on Sep. 20, 2016, the content of which is hereby incorporated by reference in its entirety.

BACKGROUND

Sensors are often used to detect various data and information. Sensors can collect data using a variety of different mechanisms. Sensors may also be used to identify objects.

SUMMARY

In one embodiment, a method for autonomous item identification in an environment including a mobile computational device and a container is provided. The method includes sensing when a selected item is placed in the container using the sensor or sensors disposed at the container. In response to sensing the selected item being placed in the container, the method includes determining a (current) location of the container using a positioning system, and sensing one or more physical characteristics of the selected item using the sensor or sensors at the container. The method also includes retrieving, from a database, a set of stored characteristics of available items proximate to the current location of the container, where the available items proximate to the current location represent a subset of a total quantity of available items within an environment. The method further includes identifying an identification code for the selected item based on a comparison of the one or more physical characteristics of the selected item with the stored characteristics retrieved from the database of the available items based on the location of the container.

In another embodiment, a system for autonomous item identification is provided in an environment including a mobile computational device and a container. The system includes one or more sensors disposed at the container, a positioning system, and a sever in communication with the mobile computation device and the one or more sensors. The one or more sensors are configured to sense a selected item being placed in the container, and sense one or more physical characteristics of the selected item. The positioning system is configured to determine a (current) location of the container in response to sensing that the selected item is being placed in the container. The server is configured to retrieve, from a database, a set of characteristics of available items proximate to the location of the container, and identify an identification code for the selected item based on a comparison of the one or more physical characteristics of the selected item with the stored characteristics retrieved from the database of the available items based on the location of the container. The available items proximate to the current location represent a subset of a total quantity of available items within an environment.

In yet another embodiment, a non-transitory computer readable medium is provided that stores instructions that when executed by a processor causes the processor to implement a method for autonomous item identification in an environment including a mobile computational device and a container is provided. The method includes sensing when a selected item is placed in the container using the sensor or sensors disposed at the container. In response to sensing the selected item being placed in the container, the method includes determining a (current) location of the container using a positioning system, and sensing one or more physical characteristics of the selected item using the sensor or sensors at the container. The method also includes retrieving, from a database, a set of stored characteristics of available items proximate to the location of the container. The available items proximate to the current location represent a subset of a total quantity of available items within an environment. The method further includes identifying an identification code for the selected item based on a comparison of the one or more physical characteristics of the selected item with the stored characteristics retrieved from the database of the available items based on the location of the container.

BRIEF DESCRIPTION OF THE DRAWINGS

The accompanying figures, which are incorporated in and constitute a part of this specification, illustrate one or more embodiments of the present disclosure and, together with the description, help to explain the present disclosure. The embodiments are illustrated by way of example and should not be construed to limit the present disclosure. In the figures.

DETAILED DESCRIPTION

Systems, methods and computer readable medium are described for autonomous item identification. Exemplary embodiments of an identification system are employed in an environment including a mobile computational device and a container. Some embodiments may include a hand-held mobile device of a user of the container. One or more sensors are disposed at the container. A positioning system is used to determine the location of the container when an item is placed in the container. For example, the container can be moved throughout the environment and the positioning system can determine the location of the container as it is moved through the environment. Using the location of the container, available items in the environment that are proximate to the container are identified. For example, the environment can cover a geographic area and can include available items disposed throughout the geographic area. Exemplary embodiments, can identify available items that are in the vicinity of the container while the remaining available items in the environment that are not in the vicinity of the current location of the container are not identified (or are identified as not being proximate to the current location of the container). Characteristics of the available items proximate to the container are retrieved. The sensors sense physical characteristics of the selected item placed in the container. The identification system compares the physical characteristics of the selected item and the characteristics of the available items to identify the selected item. The identification system identifies an identification code for the selected item. The identification system described herein automatically identifies an item based on the location of the container when the item is placed in the container and the items that are available near the container when the item was placed in the container. The identification system also uses the physical characteristics of the item sensed by the sensors at the container to identify the item.

The sensors at the container may include light sensors, weight sensors, temperature sensors, color sensors, dimension sensors, pressure sensors, humidity sensors, moisture sensors, and other sensors that may sense physical characteristics of the selected item. The positioning system may include various technologies for determining location of an object in facility, including Wi-Fi triangulation, radio waves, magnetic fields, acoustic waves, global positioning system, indoor positioning system, barometric pressure sensors, inertial sensors, and the like. The identification system may be used to validate or verify that an item placed in the container has been accounted for.

Figure 1:
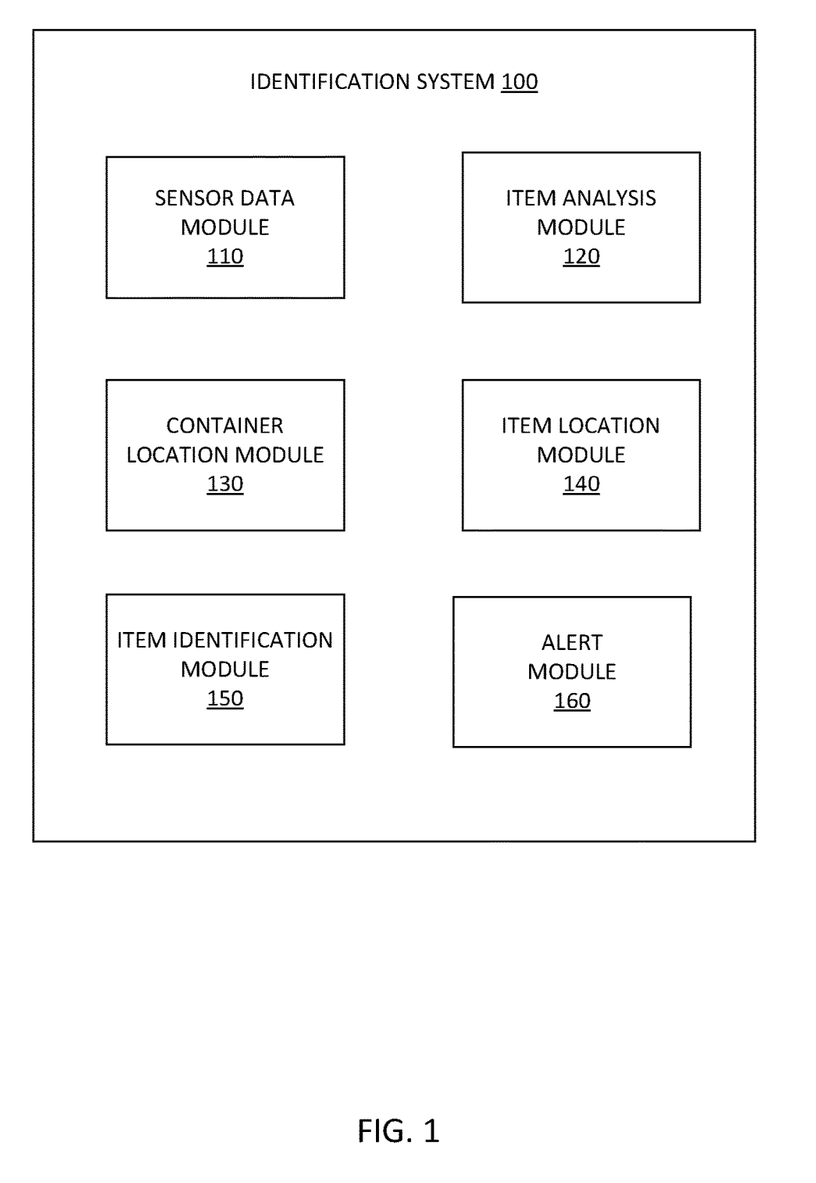
FIG. 1 is a block diagram showing an exemplary identification system for autonomous identification of items, according to an example embodiment.

FIG. 1 is a block diagram showing an identification system 100 in terms of modules for autonomous item identification, according to an example embodiment. The one or more of the modules may be implemented in server 430 shown in FIG. 4. In alternative embodiments, one or more of the modules may be implemented in device 420 shown in FIG. 4. The modules include a sensor data module 110, an item analysis module 120, a container location module 130, an item location module 140, an item identification module 150 and an alert module 160. The modules may include various circuits, circuitry and one or more software components, programs, applications, or other units of code base or instructions configured to be executed by one or more processors (e.g., included in the devices 420, 425 and/or the server 430 shown in FIG. 4). Although modules 110, 120, 130, 140, 150, 160 are shown as distinct modules in FIG. 1, it should be understood that modules 110, 120, 130, 140, 150 and 160 may be implemented as fewer or more modules than illustrated. It should be understood that in some embodiments any of modules 110, 120, 130, 140, 150 and 160 may communicate with one or more components included in exemplary embodiments (e.g., sensors 410, device 420, device 425, server 430, or database(s) 440, 445 of system 400 shown in FIG. 4).

The sensor data module 110 may be configured to receive and manage data acquired or sensed by sensors (e.g., sensors 410) disposed at the container, and maintain and control the various sensors. The data from the sensors can indicate a selected item has been placed in the container and/or can indicate a weight, a temperature, a size, a dimension, off-gassing properties, and other physical characteristics of the selected item placed in the container. In an example embodiment, at least one of the sensors at the container can be a light sensor, a weight sensor, a temperature sensor, a video/image capturing device, a color sensor, an optical sensor, a humidity sensor, a moisture sensor, a pressure sensor, a gas sensor, and/or any other suitable type of sensor.

The item analysis module 120 may be configured to analyze the data sensed by the sensors and collected by the sensor data module 110. The item analysis module 120 may determine the weight, the temperature, the size, the dimensions, the color, and/or other physical characteristics of the selected item placed in the container based on the sensed data. For example, the item analysis module 120 may determine the weight of the selected item by determining the difference between the initial weight of the container and the final weight of the container after the selected item is placed in the container. The item analysis module 120 may store the physical characteristics of the selected item in a database.

The container location module 130 may be configured to determine a location of the container using a positioning system. The positioning system may be coupled to the container. Alternatively, the positioning system may be included in the mobile computational device coupled to the container. In other embodiments, the positioning system may be included in a hand-held mobile device of a user of the container. In yet other embodiments, the positioning system may include sensors disposed at the container to detect the location of the container. In still other embodiments, the positioning system can be disposed remotely from the container and the mobile computational device and may determine a location of the container based on emissions from the mobile computational device and/or the container. The positioning system may utilize the Wi-Fi capabilities of the mobile computational device or the hand-held mobile device, or use inertial sensors, barometric pressure sensors, near-field communication sensors, Bluetooth capabilities, geo-tagging, geo-fencing, or other location tracking technologies included in the mobile computational device or the hand-held mobile device. In example embodiments, the location of the container may be determined by using an indoor positioning system, a mobile device tracking technology, radio frequency technology, or a global positioning system. The positioning system may also use radio waves, magnetic fields, or acoustic signals to determine the location of the container. For example, sensors or receivers disposed remotely the mobile computational device and the container can detect emissions from the mobile computational device and/or the container, and using at least three independent measurements from three different sensors or receivers, the location of the container may be determined by triangulation or trilateration, or other mathematical methods.

Figure 4:
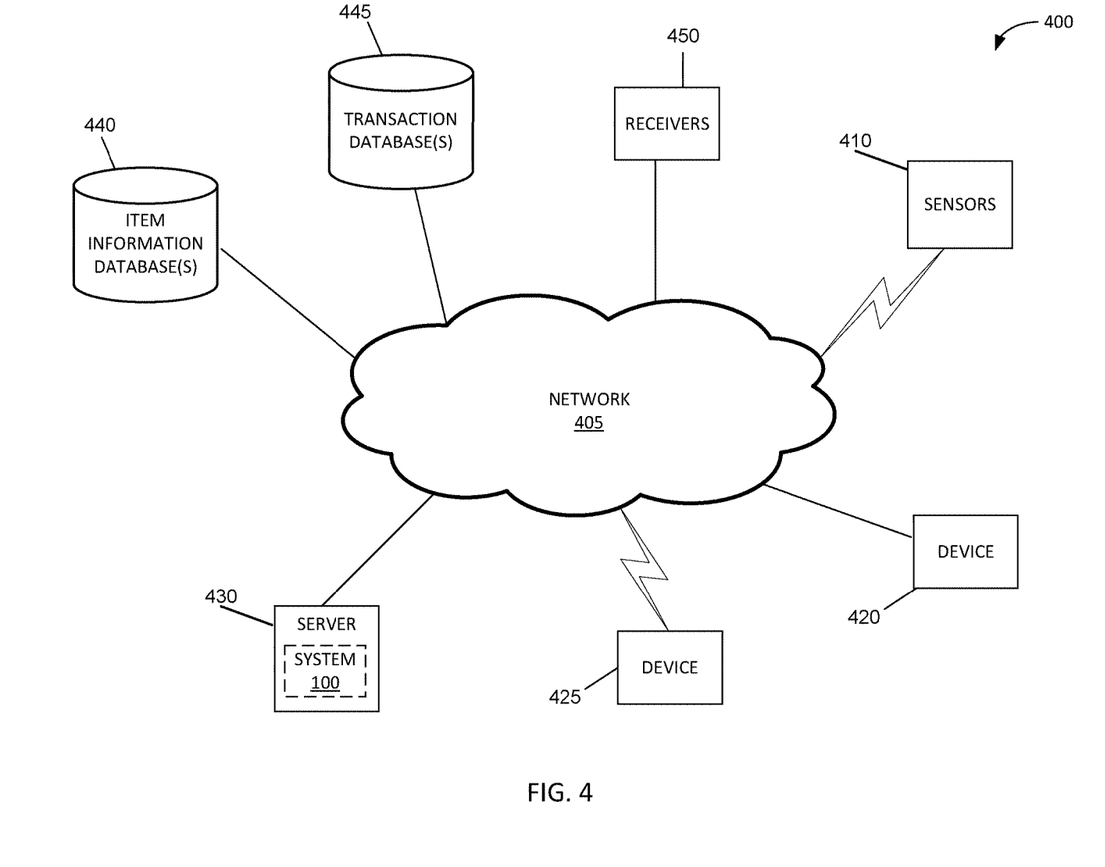
FIG. 4 is a diagram of an exemplary network environment suitable for a distributed implementation of exemplary embodiments.

The item location module 140 may be configured to retrieve data indicating available items proximate to the location of the container from a database (e.g., item information database(s) 440) when the sensors detect the selected item is placed in the container such that the location of the container can be a proxy for the location at which the selected item was disposed in the environment before the selected item was placed in the container. Available items proximate to the location of the container may be items available within a radius of zero feet to about five feet of the container. As another example, available items proximate to the location of the container may be items within about a ten feet radius from the container. As yet another example, available items proximate to the location of the container may be items within about a twenty feet radius from the container. The available items proximate to the location of the container may be items available in an aisle or a department at the facility where the container is located when the selected item is placed in the container.

The item identification module 150 may be configured to determine the identity of the selected item based on a comparison of physical characteristics of the selected item as determined using the data sensed by the sensors at the container and stored characteristics of the available items that are disposed proximate to the location of the container and which are retrieved by the item location module 140. The item identification module 150 may identify the identification code assigned to the selected item based on the comparison of the physical characteristics of the selected item and the stored characteristics of the available items proximate to the container. In an example embodiment, the identification code may be a stock keeping unit (SKU) or a barcode. Because geographically distributed available items in the environment can have similar physical characteristics, there can be potential issues associated with incorrectly identifying selected items. Exemplary embodiments of the present disclosure advantageously reduce the likelihood of incorrect identification by retrieving stored physical characteristics of a subset of the available items in the facility (i.e. the stored physical characteristics of the available items that are proximate to the container). Using this approach, if two available items in the environment share one or more physical characteristics, but the items are disposed at different locations in the environment (e.g., one of the items being disposed proximate to the container and the other being disposed away from the container), exemplary embodiments of the present disclosure can eliminate the item that is disposed away from the container and can retrieve stored physical characteristics of the item that is proximate to the container.

The alert module 160 may be configured to determine whether the selected item is included in an item log. The item log may be automatically generated by the mobile computation device or the hand-held mobile device as the user places selected items in the container. The alert module 160 may compare the identification code of the selected item to the identification codes of the items in the item log to determine if the selected item is included in the item log. The information regarding the items on the item log may be stored in a database. In some embodiments, the information regarding the items on the item log may be stored and managed by the mobile computational device coupled to the container or the hand-held device of the user of the container. As such, the alert module 160 generates an alert when an item placed in the container is not accounted for in the item log. In an exemplary embodiment, the item log includes items for a sales transaction, and the alert module 160 may be configured to validate that the selected item placed by a user in the container is included in the sales transaction.

Figure 2:
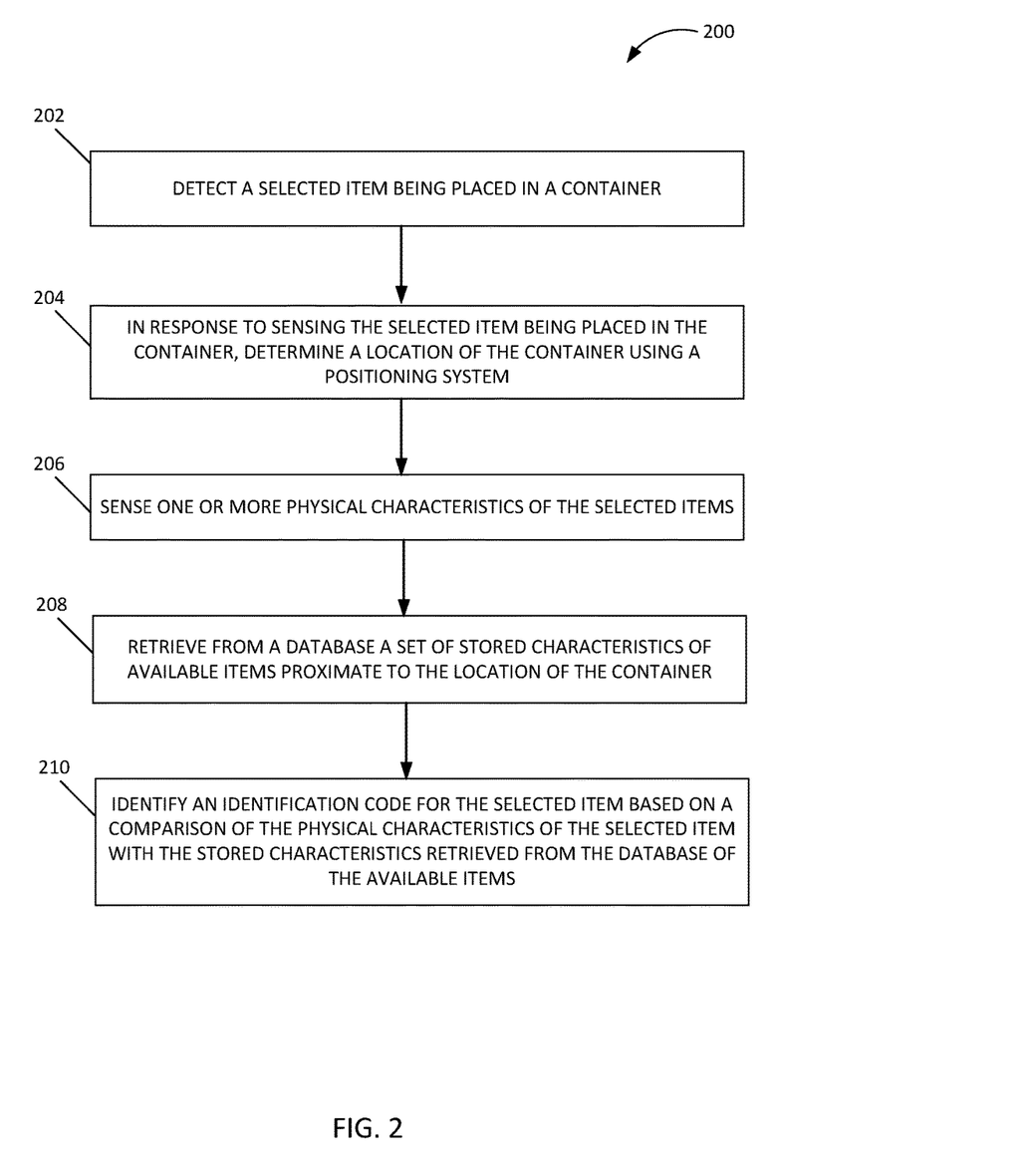
FIG. 2 is a flowchart illustrating an exemplary method for autonomous item identification in an environment including a mobile computational device and a container, according to an example embodiment.

FIG. 2 is a flowchart illustrating an exemplary method 200 for autonomous item identification in an environment including a mobile computational device and a container, according to an example embodiment. The method 200 may be performed using one or more modules of the identification system 100 described above.

At step 202, the sensor data module 110 detects a selected item being placed in the container based on the output of one or more sensors at the container. For example, a user can remove the selected item from its resting location and can place the selected item in the container. In an example embodiment, the sensor is a light sensor coupled to the container, and the light sensor senses placement of the selected item in the container in response to an interruption of light between an emitter and a receiver of the light sensor. The emitter and the receiver of the light sensor may be coupled to either ends of the container to sense the interruption of light.

At step 204, the container location module 130 determines a location of the container using a positioning system in response to the sensor data module 110 detecting placement of the selected item in the container. As such, the container location module 130 determines the location of the container at the time the selected item is placed in the container.

Example positioning systems may be coupled to the container, included in the mobile computational device coupled to the container, included in a hand-held mobile device of a user of the container, and/or may be disposed remotely from the mobile computational device, the container, and the hand-held mobile device. In yet other embodiments, the positioning system may include sensors disposed at the container to detect the location of the container. The positioning system may utilize the Wi-Fi capabilities of the mobile computational device or the hand-held mobile device, or use inertial sensors, barometric pressure sensors, near-field communication sensors, Bluetooth capabilities, geo-tagging, geo-fencing, or other location tracking technologies included in the mobile computational device or the hand-held mobile device. In example embodiments, the location of the container may be determined by using an indoor positioning system, a mobile device tracking technology, radio frequency technology, or a global positioning system. The positioning system may also use radio waves, magnetic fields, or acoustic signals to determine the location of the container. Using at least three independent measurements, the location of the container may be determined by triangulation or trilateration, or other mathematical methods.

At step 206, the sensor data module 110 determines one or more physical characteristics of the selected item based on the output of the sensors at the container. The physical characteristics of the selected item may include a weight, a temperature, a size, a dimension, a color, and/or other physical characteristics of the selected item.

In an example embodiment, the item analysis module 120 may determine one or more physical characteristics of the selected item from the data sensed at step 206. For example, the item analysis module 120 may determine a dimension or a color of the selected item based on data sensed at step 206.

As another example, the container may be coupled to more than one weight sensor (e.g., weight sensors distributed along a bottom portion of the container, and the sensor data module 110 senses the weight of the selected item at different areas in the container, realizing that there is weight differential across the item, and storing the weight differential and the respective area of the item in the database (e.g., the weight of the item may be non-uniformly distributed). The respective area of the item may be determined based on which sensor detected the weight. For example, the item may weigh one pound on a right side, but weigh two pounds on the left side. In this case, the item analysis module 120 may determine the physical characteristic of the selected item and store in the database one pound weight on right side and two pounds weight on left side for the selected item. This data may be used by the item identification module 210 to identify an identification code (as described below).

At step 208, the item location module 140 retrieves from a database (e.g., item information database(s) 440) a set of stored characteristics of available items proximate to the location of the container determined at step 204. The set of stored characteristics is stored for each of the available items with location information for each of the available items. In an example embodiment, the item location module 140 may query the database for items within a specified location. The characteristics of the items resulting from the query may be retrieved from the database and form the set of stored characteristics.

At step 210, the item identification module 150 identifies an identification code for the selected item based on a comparison of the physical characteristics of the selected item and the set of stored characteristics of available items proximate to the location of the container. For example, the item identification module 150 may compare a weight of the selected item with a weight of each of the available items proximate to the location of the container retrieved in step 208.

In this manner, identification system 100 automatically identifies the selected item placed in the container based on the location of the container, and based on the comparison of the items available proximate to the location of the container. The identification system 100 compares the physical characteristics of the selected item to the characteristics of items available near the container to identify the selected item. For example the items available near the container may be items available within a five feet radius, a ten feet radius, or a twenty feet radius from the container, or within the aisle or department where the container is located.

In an example embodiment, the method 200 also includes determining whether the selected item corresponds to one of the available items based on a comparison of the one or more physical characteristics of the selected item with the stored characteristics retrieved from the database. The alert module 160 may generate an alert at the mobile computational device if the selected item is not included in an item log. The item log may be automatically generated by the mobile computational device or the hand-held mobile device as the user places selected items in the container. In some embodiments, the alert may be generated at the hand-held mobile device of the user of the container. The alert may be a message generated on a user interface of the mobile computational device or the hand-held mobile device. The alert may be an audible sound generated at the mobile computational device or the hand-held mobile device.

In an example embodiment, the mobile computational device is in communication with a server, and the server completes a transaction with the mobile computational device in response to identifying the selected item. The items included in the transaction form the item log.

In an example embodiment, the method 200 also includes generating a task at the mobile computational device, where the task indicates the user of the mobile computational device requiring assistance. The task may be transmitted by the mobile computation device to one or more hand-held devices associated with other users proximate (within about five feet radius, ten feet radius or twenty feet radius) to the location of the container.

Figure 3A:
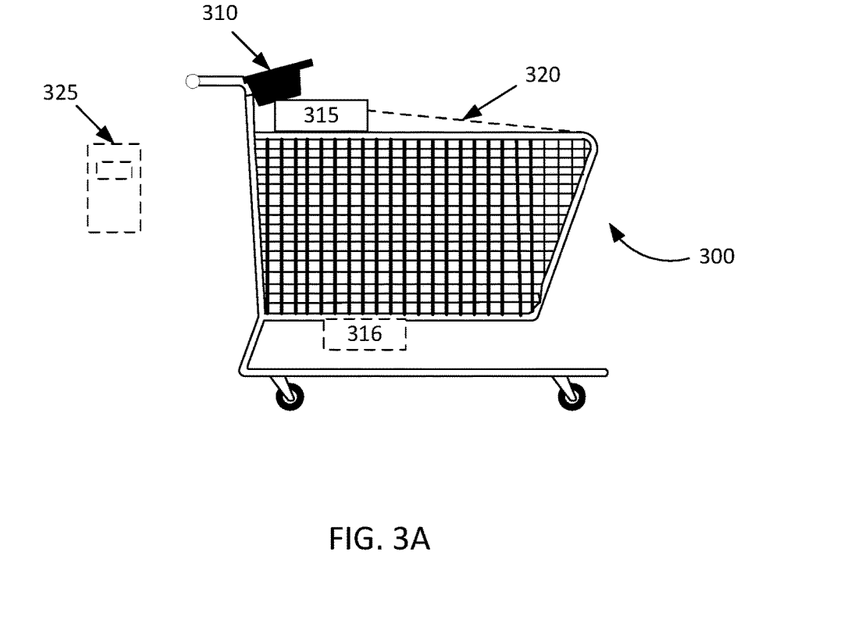
FIGS. 3A and 3B are schematics of an exemplary environment including a mobile computational device and a container, according to an example embodiment.
Figure 3B:
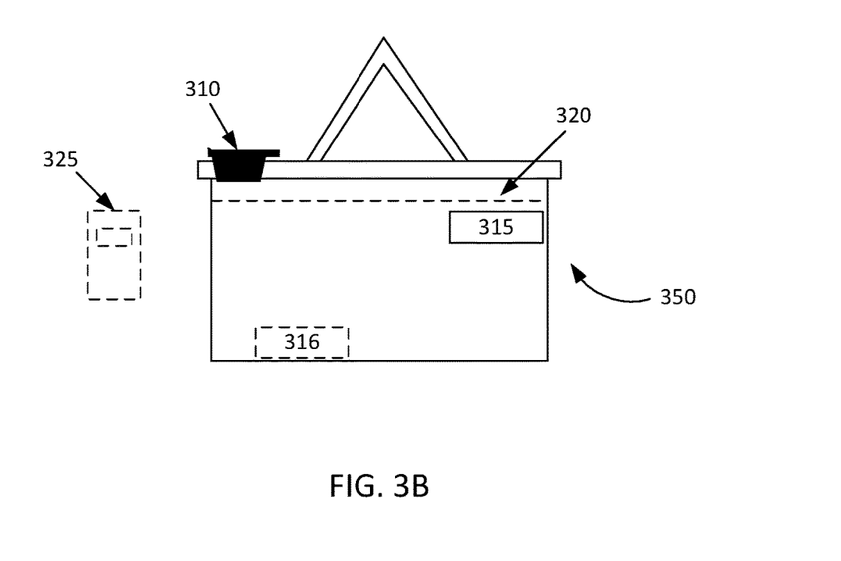

FIGS. 3A and 3B are schematics of an exemplary environment including a mobile computational device and a container. In FIG. 3A the container is a cart 300, and the mobile computational device 310 is coupled to the cart 300. In FIG. 3B the container is a basket 350, and the mobile computational device 310 is coupled to the basket 350.

As shown in FIGS. 3A and 3B, one or more sensors, for example, sensors 315 and 316, are operatively coupled to the cart 300 and the basket 350. The a light sensor 320 that senses placement of the selected item in the cart 300 when the light between an emitter and a receiver of the light sensor 320 is interrupted is also operatively coupled to the cart 300 and the basket 350. The mobile computational device 310 may include a positioning system to aid in determining the location of the cart 300 when the selected item is placed in the cart 300. In an example embodiment, the hand-held mobile device 325 of a user may be used to determine the location of the cart. In example embodiments, emissions from the mobile computational device, the hand-held device, the cart 300, and the basket 350 can be used to remotely determine a position of the cart 300 and the basket 350, respectively.

In some embodiments, the one or more sensors 315, 316 includes a weight sensor coupled to a bottom portion of the cart 300 or the basket 350 for sensing weight of the selected item placed in the container. In some embodiments, the one or more sensors 315, 316 includes a temperature sensor coupled to the cart 300 or the basket 350 for sensing temperature of the selected item placed in the container. The sensors 315, 316 may sense one or more physical characteristics of the selected item including a weight of the selected item, a temperature of the selected item, a size of the selected item, and/or a color of the selected item.

FIG. 4 illustrates a network diagram depicting a system 400 for implementing the identification system 100, according to an example embodiment. The system 400 can include a network 405, sensors 410, device 420, device 425, server 430, item information database(s) 440, transaction database(s) 445, and receiver 450. Each of sensors 410, device 420, device 425, server 430, databases 440, 445 and receivers 450 is in communication with the network 405.

In an example embodiment, one or more portions of network 405 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The sensors 410 may include, but are not limited to, light sensors, weight sensors, temperature sensors, video/image capturing devices, color sensors, optical sensors, humidity sensors, moisture sensors, pressure sensors, gas sensors, and the like.

The device 420, 425 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. The device 420, 425 can include one or more components described in relation to computing device 500 shown in FIG. 5. The device 420, 425 may connect to network 405 via a wired or wireless connection. In some embodiments, the device 420, 425 is the mobile computational device coupled to the container. In other embodiments, the device 420, 425 is the hand-held mobile device of a user of the container.

In an example embodiment, the mobile computation device (device 420 or 425) is a mobile Point-of-Sale (POS) system coupled to the container, and is used to manage and complete a transaction including at least the selected item placed in the container. As a mobile POS system, the device 420 or 425 may also include various external or peripheral devices to aid in performing sales transactions and other duties. Examples of peripheral devices include, but are not limited to, barcode scanners, cash drawers, monitors, touch-screen monitors, clicking devices (e.g., mouse), input devices (e.g., keyboard), receipt printers, coupon printers, payment terminals, and the like. Examples of payment terminals include, but are not limited to, card readers, pin pads, signature pads, signature pens, Square™ registers, LevelUp™ platform, cash or change deposit devices, cash or change dispensing devices, coupon accepting devices, and the like.

Each of the database(s) 440, 445, and server 430 is connected to the network 405 via a wired connection. Alternatively, one or more of the database(s) 440, 445, and server 430 may be connected to the network 405 via a wireless connection. Server 430 may include one or more computers or processors configured to communicate with sensors 410 and/or devices 420 and 425 via network 405. Server 430 hosts one or more applications accessed by device 420 and device 425, and/or facilitates access to the content of databases 440, 445. Server 430 may also include one or more modules of the identification system 100. Databases 440, 445 include one or more storage devices for storing data and/or instructions (or code) for use by server 430, and/or device 420, 425. Databases 440, 445 and server 430 may be located at one or more geographically distributed locations from each other or from device 420, 425. Alternatively, databases 440, 445 may be included within server 430.

The item information database(s) 440 may store characteristics of available items along with a location for each of the available items. The characteristics may include a weight, a temperature, a color, a size, a dimension, an identification code, or other characteristics for each of the available items. In some embodiments, the item information database(s) 440 stores a price for each available item. The transaction database(s) 445 may store data related to the selected item placed in the container. The transaction database(s) 445 may maintain the item log, and aid in generation of the alert.

The receivers 450 may be a radio frequency (RF) receiver and/or a WiFi receiver for detecting a beacon emitting a signal or a WiFi signal. The receivers 450 may be disposed in a facility at various locations. The location of the container may be estimated or approximated based on which of the receivers 450 receive a signal from the container, the mobile computational device or the hand-held mobile device. For example, a sensor coupled to the container may generate a RF signal that one of the receivers 450 detects. Alternatively, the mobile computational device or hand-held mobile device may generate a WiFi signal that is detected by one of the receivers 450. In some cases, the location of the container may be estimated or approximated based on the power of the signal received by the receives 450. In an example embodiment, the location of the container may be determined based on acoustic signals generated by or reflected off of the container and detected by one or more acoustic transducers (e.g., microphones) distributed over a geographic region.

Figure 5:
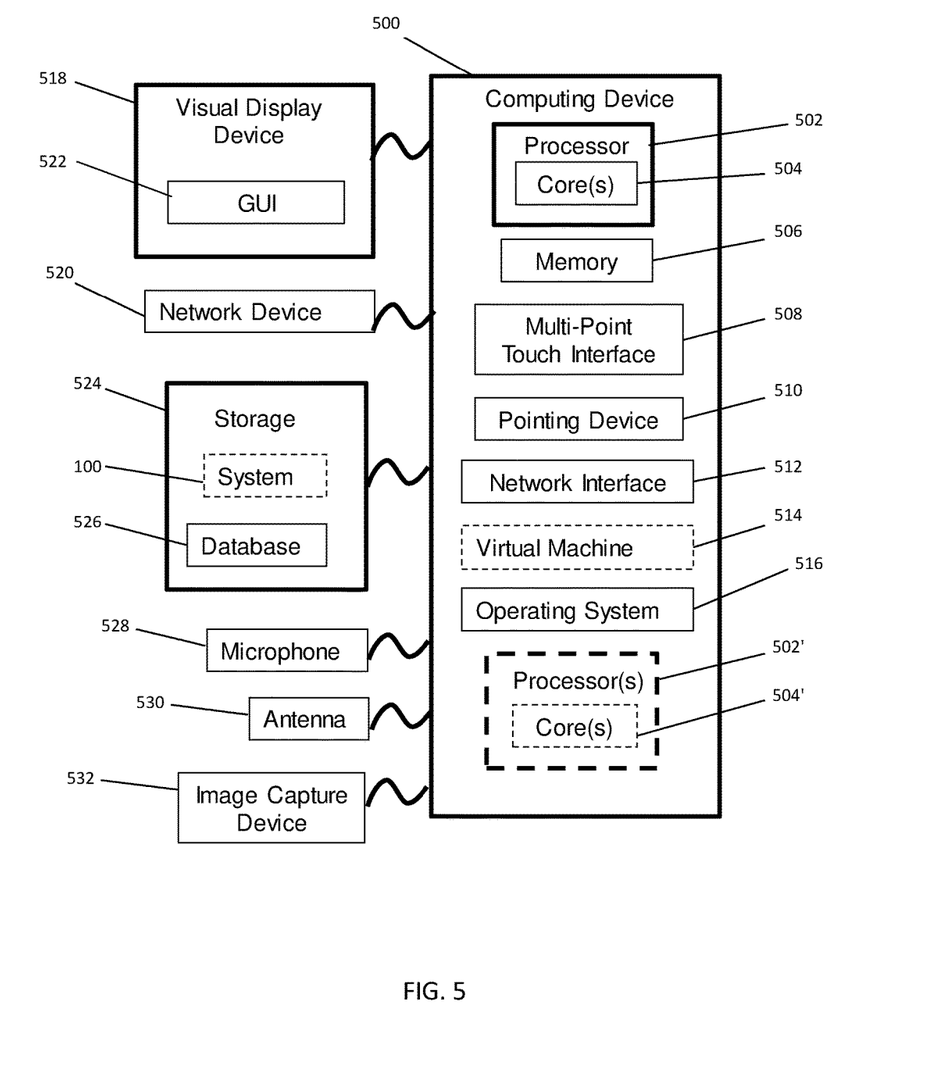
FIG. 5 is a block diagram of an exemplary computing device that may be used to implement exemplary embodiments described herein.

FIG. 5 is a block diagram of an exemplary computing device 500 that can be used to perform the methods provided by exemplary embodiments. The computing device 500 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 506 included in the computing device 500 can store computer-readable and computer-executable instructions or software for implementing exemplary embodiments. The computing device 500 also includes processor 502 and associated core 504, and optionally, one or more additional processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' can each be a single core processor or multiple core (504 and 504') processor.

Virtualization can be employed in the computing device 500 so that infrastructure and resources in the computing device can be shared dynamically. A virtual machine 514 can be provided to handle a process running on multiple processors so that the process appears to be using only one computing resource rather than multiple computing resources. Multiple virtual machines can also be used with one processor.

Memory 506 can include a computer system memory or random access memory, such as DRAM, SRAM, EDO RAM, and the like. Memory 506 can include other types of memory as well, or combinations thereof.

A user can interact with the computing device 500 through a visual display device 518, such as a touch screen display or computer monitor, which can display one or more user interfaces 519 that can be provided in accordance with exemplary embodiments. The visual display device 518 can also display other aspects, elements and/or information or data associated with exemplary embodiments. The computing device 500 can include other I/O devices for receiving input from a user, for example, a keyboard or another suitable multi-point touch interface 508, a pointing device 510 (e.g., a pen, stylus, mouse, or trackpad). The keyboard 508 and the pointing device 510 can be coupled to the visual display device 518. The computing device 500 can include other suitable conventional I/O peripherals.

The computing device 500 can also include one or more storage devices 524, such as a hard-drive, CD-ROM, or other computer readable media, for storing data and computer-readable instructions and/or software, such as the system 100 that implements exemplary embodiments of the identification system described herein, or portions thereof, which can be executed to generate user interface 519 on display 518. Exemplary storage device 524 can also store one or more databases for storing suitable information required to implement exemplary embodiments. The databases can be updated by a user or automatically at a suitable time to add, delete or update one or more items in the databases. Exemplary storage device 524 can store one or more databases 526 for storing data measured by the sensors, data for available items, location information for items, location information for the container, and other data/information used to implement exemplary embodiments of the systems and methods described herein.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of the above. The network interface 512 can include a built-in network adapter, network interface card, PCMCIA network card, card bus network adapter, wireless network adapter, USB network adapter, modem or another device suitable for interfacing the computing device 500 to a type of network capable of communication and performing the operations described herein. Moreover, the computing device 500 can be a computer system, such as a workstation, desktop computer, server, laptop, handheld computer, tablet computer (e.g., the iPad® tablet computer), mobile computing or communication device (e.g., the iPhone® communication device, a computing device employing the Android™ operating system), or other form of computing or telecommunications device that is capable of communication and that has sufficient processor power and memory capacity to perform the operations described herein.

The computing device 500 can run operating systems 516, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or another operating system capable of running on the computing device and performing the operations described herein. In exemplary embodiments, the operating system 516 can be run in native mode or emulated mode. In an exemplary embodiment, the operating system 516 can be run on one or more cloud machine instances.

The following description is presented to enable a person skilled in the art to create and use a computer system configuration and related method and systems for autonomous item identification. Various modifications to the example embodiments will be readily apparent to those skilled in the art, and the generic principles defined herein may be applied to other embodiments and applications without departing from the spirit and scope of the present disclosure. Moreover, in the following description, numerous details are set forth for the purpose of explanation. However, one of ordinary skill in the art will realize that the embodiments may be practiced without the use of these specific details. In other instances, well-known structures and processes are shown in block diagram form in order not to obscure the description of embodiments with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps can be replaced with a single element, component or step. Likewise, a single element, component or step can be replaced with multiple elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A method for autonomous item identification in an environment including a mobile computational device and a container, the method comprising:
   sensing, via one or more sensors disposed at the container, a selected item being placed in the container;
   in response to sensing the selected item being placed in the container, determining a location of the container using a positioning system;
   sensing one or more physical characteristics of the selected item via the one or more sensors at the container;
   retrieving, from a database, a set of stored characteristics of available items proximate to the location of the container;
   identifying an identification code for the selected item based on a comparison of the one or more physical characteristics of the selected item with the stored characteristics retrieved from the database of the available items based on the location of the container; and
   generating an alert at the mobile computational device if the selected item is not included in an item log representing a sales transaction.

2. The method of claim 1, wherein the alert is a message generated on a user interface of the mobile computational device.

3. The method of claim 1, wherein the alert is an audible sound generated at the mobile computational device.

4. The method of claim 1, wherein the one or more sensors includes a weight sensor coupled to a bottom portion of the container for sensing weight of the selected item placed in the container.

5. The method of claim 1, wherein the one or more sensors includes a light sensor coupled to the container for sensing placement of the selected item in the container in response to an interruption of light between an emitter and a receiver of the light sensor.

6. The method of claim 1, wherein the one or more sensors includes a temperature sensor coupled to the container for sensing temperature of the selected item placed in the container.

7. The method of claim 1, wherein the one or more physical characteristics of the selected item includes at least a weight of the selected item, a temperature of the selected item, a size of the selected item, or a color of the selected item.

8. The method of claim 1, wherein the mobile computational device is in communication with a server, and the server completes a transaction with the mobile computational device in response to identifying the selected item.

9. The method of claim 1, wherein the set of stored characteristics is stored for each of the available items with location information for each of the available items.

10. The method of claim 1, further comprising:
    generating a task at the mobile computational device, the task indicating the user of the mobile computational device requiring assistance; and
    transmitting the task to one or more hand-held devices associated with other users proximate to the location of the container.

11. The method of claim 1 further comprising retrieving data indicating available items proximate to the location of the container from a database when the sensors detect the selected item is placed in the container.

12. A system for autonomous item identification in an environment including a mobile computational device and a container, the system comprising:

one or more sensors disposed at the container configured to:
- sense a selected item being placed in the container; and
- sense one or more physical characteristics of the selected item;

a positioning system configured to determine a location of the container in response to the one or more sensors sensing the selected item being placed in the container; and a server in communication with the mobile computational device and the one or more sensors, the server configured to:
- retrieve, from a database, a set of characteristics of available items proximate to the location of the container;
- identify an identification code for the selected item based on a comparison of the one or more physical characteristics of the selected item with the stored characteristics retrieved from the database of the available items based on the location of the container; and
- generate an alert at the mobile computational device if the selected item is not included in an item log representing a sales transaction.

13. The system of claim 12, wherein the one or more sensors includes a weight sensor coupled to a bottom portion of the container for sensing weight of the item placed in the container.

14. The system of claim 12, wherein the one or more sensors includes a light sensor coupled to the container for sensing placement of the selected item in the container in response to an interruption of light between an emitter and a receiver of the light sensor.

15. The system of claim 12, wherein the one or more sensors includes a temperature sensor coupled to the container for sensing temperature of the selected item placed in the container.

16. The system of claim 12, wherein the one or more physical characteristics of the selected item includes at least a weight of the selected item, a temperature of the selected item, a size of the selected item, or a color of the selected item.

17. The system of claim 12 wherein data indicating available items proximate to the location of the container is retrieved from a database when the sensors detect the selected item is placed in the container.

18. A non-transitory computer readable medium storing instructions to cause a processor to implement a method for autonomous item identification in an environment including a mobile computational device and a container, the method comprising:

- sensing, via one or more sensors disposed at the container, a selected item being placed in the container;
- in response to sensing the selected item being placed in the container, determining a location of the container using a positioning system;
- sensing one or more physical characteristics of the selected item via the one or more sensors at the container;
- retrieving, from a database, a set of stored characteristics of available items proximate to the location of the container;
- identifying an identification code for the selected item based on a comparison of the one or more physical characteristics of the selected item with the stored characteristics retrieved from the database of the available items based on the location of the container;
- generating an alert at the mobile computational device if the selected item is not included in an item log representing a sales transaction.

19. The non-transitory computer readable medium of claim 18, wherein the one or more characteristics of the selected item includes at least a weight of the item, a temperature of the item, a size of the item, or a color of the item.

20. The non-transitory computer readable medium of claim 18, wherein data indicating available items proximate to the location of the container is retrieved from a database when the sensors detect the selected item is placed in the container.

* * * * *